United States Patent [19]

Dill et al.

[11] Patent Number: 4,949,790

[45] Date of Patent: Aug. 21, 1990

[54] COMPOSITIONS AND METHOD FOR CONTROLLING PRECIPITATION WHEN ACIDIZING SOUR WELLS

[75] Inventors: Walter R. Dill; Michael L. Walker, both of Duncan, Okla.

[73] Assignee: Halliburton Company, Duncan, Okla.

[21] Appl. No.: 320,655

[22] Filed: Mar. 7, 1989

Related U.S. Application Data

[62] Division of Ser. No. 177,743, Apr. 5, 1988, Pat. No. 4,888,121.

[51] Int. Cl.$^5$ .................... E21B 37/00; E21B 43/27
[52] U.S. Cl. .................... 166/307; 166/271; 166/312; 252/8.553
[58] Field of Search ............ 252/8.553; 166/271, 166/279, 307, 310, 312, 902

[56] References Cited

U.S. PATENT DOCUMENTS

| | | |
|---|---|---|
| 1,805,052 | 5/1931 | Sebrell . |
| 2,175,095 | 10/1939 | Stoesser . |
| 2,227,860 | 1/1941 | Morgan et al. . |
| 2,335,689 | 11/1943 | Morgan et al. .................. 252/3.55 |
| 2,384,467 | 9/1945 | Hill .................................. 252/148 |
| 2,426,318 | 8/1947 | Menaul ........................... 252/8.55 |
| 2,496,594 | 2/1950 | Moyer et al. ................... 252/8.55 |
| 2,605,223 | 7/1952 | Case ............................... 252/8.55 |
| 3,122,204 | 2/1964 | Oakes ......................... 252/8.553 X |
| 3,142,335 | 7/1964 | Dill et al. . |
| 3,402,770 | 9/1968 | Messenger .................. 252/8.552 X |
| 3,913,678 | 10/1975 | Blount et al. ................... 166/310 |
| 4,096,914 | 6/1978 | McLaughlin et al. ........... 166/307 |
| 4,151,098 | 4/1979 | Dill et al. ........................ 252/8.55 |
| 4,167,214 | 9/1979 | Street, Jr. ...................... 166/307 |
| 4,213,866 | 7/1980 | Ashby .......................... 252/8.553 |
| 4,317,735 | 3/1982 | Crowe ........................... 252/8.55 |
| 4,493,775 | 1/1985 | Coffey et al. .................. 252/8.55 |
| 4,537,684 | 8/1985 | Gallup et al. ................... 210/696 |
| 4,633,949 | 1/1987 | Crowe ............................ 166/279 |
| 4,683,954 | 8/1987 | Walker et al. .................. 166/307 |

*Primary Examiner*—George A. Suchfield
*Attorney, Agent, or Firm*—Robert A. Kent

[57] ABSTRACT

A precipitation control additive composition, an acidizing composition for treating a sour well and a method of treating a sour well are provided. An iron sequestering agent and a sulfide modifier are added to a treating solution. The iron sequestering agent combines with iron present in the solution while the sulfide modifier combines with sulfides present in the solution. By combining with both iron and sulfides present in the solution, the combination of an iron sequestering agent and a sulfide modifier effectively inhibits precipitation of ferric hydroxide, ferrous sulfide and free sulfur from the solution. As a result, formation and other serious damage is prevented.

7 Claims, No Drawings

COMPOSITIONS AND METHOD FOR CONTROLLING PRECIPITATION WHEN ACIDIZING SOUR WELLS

This is a divisional of application Ser. No. 177,743, filed Apr. 5, 1988, now U.S. Pat. No. 4,888,121.

BACKGROUND OF THE INVENTION

1. Field of the Invention

The present invention relates generally to compositions and methods for controlling precipitation when treating oil and gas wells with an acid solution, and more particularly, but not by way of limitation, to compositions and methods for controlling precipitation of ferrous sulfide and free sulfur when treating sour oil and gas wells with an acid solution.

2. Description of the Prior Art

Acid solutions are used to treat oil and gas wells in many ways. For example, acid solutions are commonly injected through the wellbore into the formation to increase the permeability of the formation and to stimulate production of oil and gas therefrom. Acid solutions are also used in cleanup processes carried out in connection with various types of wells and associated piping and equipment.

Iron precipitation has been a problem encountered in acid treatment operations for many years. The acid dissolves iron containing scale from pipe and equipment and iron containing minerals present in the formation. As the acid spends and the pH of the acid solution increases, iron present in the solution in the ferric, Fe (III), oxidation state precipitates as ferric hydroxide ($Fe(OH)_3$). The ferric hydroxide precipitate can plug the formation and cause other serious damage.

Precipitation of ferric hydroxide can be controlled by adding an iron sequestering and/or iron reducing agent to the acid. Iron sequestering agents such as citric acid and ethylenediaminetetraacetic acid (EDTA) chelate the iron and hold it in the solution. Iron reducing agents convert ferric iron present in the solution to the less-damaging ferrous state.

When a well being treated with an acid solution is sour, controlling precipitation of ferric hydroxide is not enough. A well is sour when it contains a significant amount of hydrogen sulfide. The combination of sulfide ions from hydrogen sulfide and iron creates additional precipitation problems.

Sulfide ions reduce ferric ions to ferrous ions by the following reation:

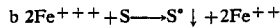
$$b\ 2Fe^{+++} + S^{--} \rightarrow S° \downarrow + 2Fe^{++}$$

This reaction is beneficial in that ferric ions are reduced to ferrous ions and less precipitation of ferric hydroxide occurs. Yet, the reaction is detrimental in that elemental or free sulfur is formed. Free sulfur can plug the formation and cause other serious damage.

In addition, sulfide ions react with ferrous ions to form ferrous sulfide, FeS. Ferrous sulfide scale deposited on tubing and casing is often dissolved by the acid and carried into the formation. Also, sulfides present in the formation react with ferrous iron in the acid solution. When the acid reacts with the formation and spends to a pH of about 1.9, a pH well below the pH of completely spent acid, the ferrous sulfide in the acid solution precipitates. Like free sulfur, ferrous sulfide precipitate can plug the formation and cause other serious damage.

Thus, precipitation problems encountered in acid treatment operations carried out on sour wells are more complex. When treating a sour well with acid contaminated with iron, precipitation of free sulfur and ferrous sulfide as well as precipitation of ferric hydroxide must be controlled.

Previous attempts to control precipitation of free sulfur and ferrous sulfide when treating a sour well have been only partially successful.

Attempts to control precipitation of ferrous sulfide by maintaining the pH of the acid solution below 1.9 have failed. In most acid treatment operations, it is not feasible to maintain the pH of the acid solution below 1.9 during the entire operation.

In U.S. Pat. No. 4,633,949, a method and composition for preventing precipitation of ferrous sulfide and sulfur when acidizing a sour well are disclosed. An iron complexing agent such as ethylenediaminetetraacetic acid (EDTA) and an iron reducing agent such as erythorbic acid are added to the primary acidizing solution. The iron complexing agent is added to stabilize the ferrous ion in solution in order to inhibit precipitation of ferrous sulfide, FeS. The iron reducing agent is added to reduce ferric ion to ferrous ion in order to inhibit formation of elemental sulfur. Unfortunately, the reducing agent does not adequately prevent the formation of elemental sulfur. Precipitation of both elemental sulfur and ferrous sulfide is not adequately controlled by merely controlling the iron present in the acid solution.

SUMMARY OF THE INVENTION

By the present invention, improved compositions and an improved method for controlling precipitation of ferric hydroxide, ferrous sulfide and free sulfur when treating a sour well with an acid solution are provided. An iron sequestering agent and a sulfide modifier are combined with the acid solution. The iron sequestering agent combines with iron present in the solution while the sulfide modifier combines with sulfides present in the solution. By suppressing or tying up both iron and sulfides present in the solution, the combination of an iron sequestering agent and a sulfide modifier effectively inhibits precipitation of ferric hydroxide, ferrous sulfide and free sulfur from the solution. As a result, formation and other serious damage is prevented.

In one aspect, the present invention provides a precipitation control additive composition for an acidizing solution used to treat a sour well. The additive composition comprises an iron sequestering agent to combine with iron present in the solution and a sulfide modifier to combine with sulfides present in the solution. The precipitation control additive functions to inhibit precipitation of ferric hydroxide, ferrous sulfide and free sulfur.

In another aspect, the present invention provides an acidizing composition for treating a sour well. The acidizing composition comprises a base acid solution, an iron sequestering agent to combine with iron present in the solution and a sulfide modifier to combine with sulfides present in the solution. The acidizing composition can be used to treat sour wells without causing precipitation of ferric hydroxide, ferrous sulfide and/or free sulfur.

In yet another aspect, the present invention provides a method of treating a sour well. The method comprises the step of introducing into the well a primary base acid solution, an iron sequestering agent to combine with iron present in the primary base acid solution and a sulfide modifier to combine with sulfides present in the primary base acid solution. As the method is carried out, precipitation of ferric hydroxide, precipitation of ferrous sulfide and precipitation of free sulfur are inhibited.

The precipitation control additive composition of the present invention is not limited to use with an acidizing solution used to treat a sour well. For example, the additive composition can be used to inhibit precipitation of ferrous sulfide, free sulfur and other iron and/or sulfur containing compounds from a cleaning solution that becomes contaminated with iron and sulfides when used to clean the internal surfaces of industrial equipment and the like. The additive composition inhibits precipitation from both acidic and alkaline cleaning solutions.

The iron sequestering agent of the precipitation control additive composition, the iron sequestering agent of the acidizing composition and the iron sequestering agent used in the method preferably comprise at least one compound selected from the group consisting of aminopolycarboxylic acids, hydroxycarboxylic acids, cyclic polyethers and derivatives of such acids and ethers. The sulfide modifier of the precipitation control additive composition, the sulfide modifier of the acidizing composition and the sulfide modifier used in the method preferably comprise at least one member selected from the group consisting of an aldehyde, acetal, hemiacetal and any other compound capable of forming aldehydes in solution.

It is, therefore, a principal object of the present invention to provide improved compositions and an improved method for controlling precipitation of ferric hydroxide, ferrous sulfide and free sulfur when treating a sour oil and gas well with an acid solution.

Numerous other objects, features and advantages of the present invention will be readily apparent to those skilled in the art upon a reading of the following disclosure including the examples provided therewith.

DESCRIPTION OF THE PREFERRED EMBODIMENTS

In accordance with the present invention, a precipitation control additive composition, an acidizing composition for treating a sour well and a method of treating a sour well are provided. Although they are related in many ways, each aspect of the present invention will be described separately below.

As used herein and in the appended claims, a sour well refers to an oil and gas well that contains sulfide ions, hydrogen sulfide and/or other sulfide containing compounds. The term sulfides includes free sulfide ions, sulfides combined with hydrogen in the form of hydrogen sulfide and sulfides combined with other elements in the form of other compounds. The term "well" refers to a subterranean formation, a wellbore penetrating the subterranean formation and all piping and equipment associated therewith. The term "well" includes both injection and production wells.

The precipitation control additive composition of the present invention can be used in many ways. It is particularly useful as an additive for an acidizing solution used to treat a sour well. It comprises an iron sequestering agent to combine with iron present in the solution and a sulfide modifier to combine sulfides present in the solution. The additive composition inhibits precipitation of ferric hydroxide, ferrous sulfide and free sulfur.

The additive composition can be used with all types of acidizing solutions, including solutions comprising hydrochloric acid, hydrofluoric acid, formic acid, acetic acid and various mixtures of such acids. Preferably, the acidizing solution to which the additive composition is added comprises hydrochloric acid. It may be desirable to mix an organic acid such as acetic acid and/or one or more salts thereof with the hydrochloric acid solution. The additive composition can be used in conjunction with other acidizing solution additives.

The additive composition is preferably admixed with the acidizing solution prior to introducing the solution to the well. Alternatively, the additive composition can be admixed with the acidizing solution in the formation. If admixed in the formation, the additive composition can be added to the formation prior to, at the same time as or after the acidizing solution is added thereto. The iron sequestering agent and sulfide modifier can be added to the formation one at a time. It is important for the iron sequestering agent and sulfide modifier to be admixed with the acidizing solution before the acid spends to any great extent.

The amount of the additive composition that should be admixed with the acidizing solution varies depending upon the nature of the well, the type of acid used and other factors. The additive composition should be used in an amount great enough to prevent precipitation of ferric hydroxide, ferrous sulfide and free sulfur during treatment, after the acid spends and until the spent acid can be recovered.

The relative proportions of the iron sequestering agent and sulfide modifier of the additive composition should be adjusted according to the amount of iron and sulfides present in the formation. Other factors such as the type of acid used, the solubility of the iron sequestering agent in the acid and the efficacy of the iron sequestering agent to sequester iron are also pertinent to the proportions employed. In most applications, the iron sequestering agent should be employed in an amount such that it comprises in the range of from about 0.25 to about 5 percent by weight of the acidizing solution when the additive composition is added thereto. Similarly, in most applications, the sulfide modifier should be employed in an amount such that it comprises in the range of from about 0.25 to about 5 percent by weight of the acidizing solution when the additive composition is added thereto. Preferably, the iron sequestering agent is employed in an amount such that it comprises in the range of from about 1 to about 4 percent by weight of the acidizing solution when the additive composition is added thereto. Preferably, the sulfide modifier is employed in an amount such that it comprises in the range of from about 1 to about 4 percent by weight of the acidizing solution when the additive composition is added thereto. It is generally not detrimental to use more sulfide modifier than is needed.

Although it is particularly useful as an additive for an acidizing solution used to treat a sour well, the additive composition of the present invention can be used in many other ways. It can be used to control precipitation in all types of cleaning processes.

For example, the additive composition of the present invention can be used to control precipitation during cleaning operations carried out to remove scale from the internal surfaces of industrial equipment such as feed water heaters, steam boilers, service water systems and the like. In such operations, scale is dissolved from the surfaces of the equipment by contacting the scale with a cleaning solution. If sulfide scale is removed from a ferrous surface, or if the cleaning solution otherwise becomes contaminated with sulfides and iron, precipitation of ferrous sulfide, free sulfur and other iron and/or sulfur containing compounds can occur. Such precipitation can interfere with the cleaning operation and can cause damage to the equipment being cleaned. The additive composition of the present invention can be added to the cleaning solution to inhibit the precipitation.

The additive composition functions in a solution used to clean the surfaces of equipment in the same way that it functions in an acidizing solution used to treat a sour well. The iron sequestering agent combines with iron present in the solution while the sulfide modifier combines with sulfides present in the solution. By suppressing or tying up both iron and sulfides dissolved in the cleaning solution, the additive composition effectively inhibits precipitation of ferrous sulfide, free sulfur and other iron and/or sulfur containing compounds from the solution. The additive composition functions in both acetic and alkaline cleaning solutions.

The acidizing composition of the present invention can be used in all types of treatment operations carried out on sour wells. It can be used by itself or in conjunction with other treatment compositions. The acidizing composition comprises a base acid solution, an iron sequestering agent to combine with iron present in the solution and a sulfide modifier to combine with sulfides present in the solution. Precipitation of ferric hydroxide, precipitation of ferrous sulfide and precipitation of free sulfur are inhibited during use of the acidizing composition to treat sour wells.

The base acid solution can comprise any type of acidizing solution, including aqueous solutions comprising hydrochloric acid, hydroflouric acid, formic acid, acetic acid and various mixture of such acids. Preferably, the base acid solution comprises hydrochloric acid. It may be desirable to mix an organic acid such as acetic acid and/or or one or more salts thereof with the hydrochloric acid solution.

The iron sequestering agent and sulfide modifier are preferably admixed with the base acid solution prior to introducing the base acid solution to the well. The iron sequestering agent and sulfide modifier can also be admixed with the base acid solution in the formation. If admixed with the base acid solution in the formation, the iron sequestering agent and sulfide modifier can be added to the formation prior to, at the same time as or after the base acid solution is added thereto. The iron sequestering agent and sulfide modifier can be added to the formation together or one at a time. It is important for the iron sequestering agent and sulfide modifier to be admixed with the base acid solution before the acid spends to any great extent.

The amounts of base acid solution, iron sequestering agent and sulfide modifier to use varies depending on many factors such as the amount of iron and sulfides present in the formation. Other factors such as the type of acid used, the solubility of the iron sequestering agent in the acid and the efficacy of the iron sequestering agent to sequester iron are also pertinent to the amounts used. The components should be employed in amounts sufficient to prevent precipitation of ferric hydroxide, free sulfur and ferrous sulfide during treatment, after the acid spends and until the spent acid can be recovered from the formation. Typically, in most applications, the iron sequestering agent should be employed in an amount such that it comprises in the range of from about 0.25 to about 5 percent by weight of the solution. Similarly, in most applications, the sulfide modifier should be employed in an amount such that it comprises in the range of about 0.25 to about 5 percent by weight of the solution. Preferably, the iron sequestering agent is employed in an amount such that it comprises in the range of from about 1 to about 4 percent by weight of the solution. Preferably, the sulfide modifier is employed in an amount such that it comprises in the range of from about 1 to about 4 percent by weight of the solution. It is generally not detrimental to use more sulfide modifier than is needed.

The method of treating a sour well of the present invention comprises the step of introducing into the well a primary base acid solution, an iron sequestering agent to combine with iron present in the primary base acid solution and a sulfide modifier to combine with sulfides present in the primary base acid solution. As the method is carried out, precipitation of ferric hydroxide, precipitation of ferrous sulfide and precipitation of free sulfur are inhibited.

The primary base acid solution can comprise any type of acidizing solution, including aqueous solutions comprising hydrochloric acid, hydrofluoric acid, formic acid, acetic acid and various mixtures of such acids. Preferably, the primary base acid solution comprises hydrochloric acid. It may be desirable to mix an organic acid such as acetic acid and/or one or more salts thereof with the hydrochloric acid solution.

Preferably, the primary base acid solution iron sequestering agent and sulfide modifier are admixed together prior to being introduced into the well. If desired, the primary base acid solution, iron sequestering agent and sulfide modifier can be added to the well one after the other. It is important for the iron sequestering agent and sulfide modifier to be present with the primary base acid solution before the acid spends to any great extent. The components can be injected and circulated in the well by any such technique as is generally known in the art.

Preferably, the primary base acid solution is recovered from the well after it has become substantially spent or after the well has been sufficiently treated. The spent acid can be recovered by producing the formation, by driving the spent acid through the formation to a recovery well, or by driving the spent acid over such a wide area that any precipitate that forms cannot have a detrimental effect.

In certain applications where very large amounts of either iron or sulfides are encountered, it may be desirable to flush the formation with a preflush acidizing composition prior to introducing the primary base acid solution, iron sequestering agent and sulfide modifier to the well. For example, if the formation contains a large amount of hydrogen sulfide, a preflush base acid solution and preflush sulfide modifier can be introduced into the well prior to introducing the primary base acid solution, iron sequestering agent and sulfide modifier to the well. It may also be desirable to flush the formation with a postflush base acid solution, postflush iron sequestering agent and/or postflush sulfide modifier after the spent primary base acid solution is recovered therefrom.

The amount of primary base acid solution, iron sequestering agent and sulfide modifier to use varies depending upon many factors such as the amount of iron and sulfides present in the formation. Other factors such as the type of acid used, the solubility of the iron sequestering agent in the acid and the efficacy of the iron sequestering agent to sequester iron are also pertinent to the amounts used. The components should be used in amounts sufficient to prevent precipitation during treatment, after the acid spends and until the spent acid can be recovered. Typically, in most applications, the iron sequestering agent should be employed in an amount such that it comprises in the range of from about 0.25 to about 5 percent by weight of the solution. Similarly, in most applications, the sulfide modifier should be employed in an amount such that is comprises in the range of from about 0.25 to about 5 percent by weight of the solution. Preferably, the iron sequestering agent is employed in an amount such that it comprises in the range of from about 1 to about 4 percent by weight of the solution. Preferably, the sulfide modifier is employed in an amount such that it comprises in the range of from about 1 to about 4 percent by weight of the solution. It is generally not detrimental to use more sulfide modifier than is needed.

The iron sequestering agent of the precipitation control additive composition, the iron sequestering agent of the acidizing composition and the iron sequestering agent used in the method combine with iron present in the solution to retain iron in the solution and to decrease the amount of iron capable of reacting with sulfides present in the solution. Any iron sequestering agent capable of combining with iron present in the solution to retain iron in the solution and to decrease the amount of iron capable of reacting with sulfides present in the solution can be used in all aspects of the present invention.

Preferably, the iron sequestering agent of the compositions and method of the present invention comprises at least one compound selected from the group consisting of aminopolycarboxylic acids, hydroxycarboxylic acids, cyclic polyethers and derivatives of such acids and ethers.

Examples of suitable aminopolycarboxylic acids are chelating agents such as nitrilotriacetic acid (NTA), ethylenediaminetetraacetic acid (EDTA), hydroxyethylethylenediaminetriacetic acid (HEDTA) and salts thereof. Ethylenediaminetetraacetic acid (EDTA) is a strong chelating agent for iron. It has a solubility of 68 lb/Mgal (8.2 mg/L) in an aqueous solution containing 15% hydrochloric acid at 75° F. Nitrilotriacetic acid (NTA) is also a strong chelating agent for iron. It has a solubility of 420 lb/Mgal (50.4 g/L) in an aqueous solution containing 15% hydorchloric acid at 75° F.

Data demonstrating the solubility of nitrilotriacetic acid (NTA) in various acid solutions at 75° F. is presented in Table I below.

TABLE I

| Solubility of NTA in Various Acid Solutions | |
|---|---|
| Acid Solution | Solubility of NTA* (lb/Mgal) |
| 15% Hydrochloric | 420 |
| 12% Hydrochloric - 3% Hydrofluoric | 200 |
| 7.5% Hydrochloric - 1.5% Hydrofluoric | 85 |
| 13.5% Hydrochloric - 10% Acetic | 454 |
| 13.5% Hydrochloric - 9% Formic | 437 |
| 10.0% Acetic | 11 |

TABLE I-continued

| Solubility of NTA in Various Acid Solutions | |
|---|---|
| Acid Solution | Solubility of NTA* (lb/Mgal) |
| 10.0% Formic | 9 |

*Pounds of NTA dissolved in 1000 gallons of the acid solution after approximately 30 minutes.

An example of a suitable hydroxycarboxylic acid is citric acid. Citric acid is a strong chelating agent for iron and is readily soluble in acid solutions. The effectiveness of citric acid as an iron sequestering agent in most applications decreases at temperatures above 200° F.

An example of a suitable cyclic polyether is dicyclohexyl-15-crown-5. This compound may decompose in an acid solution if the acid solution remains in the formation for a long period of time.

Of the group consisting of aminopolycarboxylic acids, hydrocarboxylic acids, cyclic polyethers and derivatives of such acids and ethers, nitrilotriacetic acid (NTA), ethylenediaminetetraacetic acid (EDTA) and derivatives of such acids are more preferred. Due to their greater solubility in starting acid solutions, nitrilotriacetic acid (NTA) and derivatives such as sodium salts thereof are most preferred. It is often beneficial to utilize mixtures of one or more iron sequestering agents.

The sulfide modifier of the precipitation control additive composition, the sulfide modifier of the acidizing composition and the sulfide modifier used in the method combine with sulfides present in the solution to decrease the amount of sulfides that are capable of reacting with iron present in the solution. For example, formation of free sulfur by the reduction of ferric iron to ferrous iron by sulfides is inhibited or prevented. Any sulfide modifier capable of combining with sulfides present in the solution to decrease the amount of sulfides capable of reacting with iron present in the solution can be used in all aspects of the present invention.

Preferably, the sulfide modifier of the compositions and method of the present invention comprises at least one member selected from the group consisting of an aldehyde, acetal, hemiacetal and any other compound capable of forming aldehydes in solution. Suitable aldehydes include aldol, butyraldehyde, heptaldehyde, propionaldehyde, formaldehyde, acetaldehyde, benzaldehyde, difunctional aldehydes such as glutaraldehyde and derivatives of such aldehydes.

The nature of the reaction product between aldehydes and sulfides varies depending upon the particular aldehyde. For example, formaldehyde combines with sulfides to yield trithiane ($C_3H_3S_3$). Trithiane is stable in acid solutions.

Inasmuch as the reactivity of aldehydes, acetals, hemiacetals and similar compounds is not very dependent on their molecular weight, the compounds having relatively low molecular weights are preferred. On the other hand, aldehydes having relatively low molecular weights tend to have a higher vapor pressure which makes them difficult to handle. Due to its low molecular weight and low vapor pressure, aldol (beta-hydroxybutyraldehyde) is the preferred aldehyde for use as the sulfide modifier of the compositions and method of the present invention.

By combining an iron sequestering agent and a sulfide modifier with the solution, very effective control of precipitation of ferric hydroxide, precipitation of ferrous sulfide and precipitation of free sulfur is achieved. By combining with iron to retain iron in the solution and to decrease the amount of iron capable of reacting with sulfides present in the solution, the iron sequestering agent inhibits precipitation of ferric hydroxide, precipitation of ferrous sulfide and, to some extent, precipitation of free sulfur. By combining with sulfides present in the solution to decrease the amount of sulfides capable of reacting with iron present in the solution, the sulfide modifier inhibits precipitation of ferrous sulfide and precipitation of free sulfur. The combination of an iron sequestering agent and a sulfide modifier results in enhanced control of precipitation of ferric hydroxide, precipitation of ferrous sulfide and precipitation of free sulfur.

Other components can be combined with the iron sequestering agent and sulfide modifier of the compositions and method of the present invention. For example, one or more surface active agents can be employed to improve the dispersion of the sulfide modifier in the solution. Surface active agents are particularly useful when relatively longer chain aldehydes are used as the sulfide modifier. Such aldehydes tend to be less soluble in water than shorter chain aldehydes. The surface active agent or agents can be blended directly with the sulfide modifier by itself or with the sulfide modifier as combined with the iron sequestering agent and/or acid solution. Alternatively, the surface active agent or agents can be admixed with the solution before the sulfide modifier is added thereto. The agent or agents should be used in amounts sufficient to thoroughly disperse the sulfide modifier in the solution. Examples of surface active agents that can be used are ethoxylated nonylphenols, fatty amines, ethoxylated fatty amines, quaternary fatty amines and ethoxylated quaternary fatty amines.

Other components that can be combined with the iron sequestering agent and sulfide modifier of the compositions and method of the present invention include corrosion inhibitors, pH control additives, fluid loss additives, nonemulsifying agents, reducing agents, oxygen scavengers and product development additives such as mutual solvents. Depending upon the particular application, some of these additional components can be used to enhance the degree of precipitation control achieved. For example, reducing agents can be used to reduce ferric iron to ferrous iron. Oxygen scavengers can be used to reduce the amount of oxygen present in the acid solution to inhibit formation of ferric iron by oxidation of ferrous iron. Compounds such as erythorbic acid and hydroxylamine complex serve as both iron reducing agents and oxygen scavengers. Erythorbic acid also acts as an iron complexing agent.

A suitable mutual solvent for use in connection with the iron sequestering agent and sulfide modifier of the present invention is ethylene glycol monobutyl ether ($C_6H_{14}O_2$). Ethylene glycol monobutyl ether helps solubilize the aldehyde or other sulfide modifier in the solution. It enhances the function of surface active agents when surface active agents are blended with the sulfide modifier.

The advantages achieved by the compositions and method of the present invention are numerous. Very effective control of precipitation of ferric hydroxide, precipitation of ferrous sulfide and precipitation of free sulfur is achieved when sour oil and gas wells are treated. The amount of iron that can be complexed in the acid solution is greatly enhanced by the combination of both an iron sequestering agent and a sulfide modifier.

The amounts of the components used can be adjusted depending upon the amount and type of iron present and the amount of sulfides present in the acid solution. All of the components are readily available and easy to use. The iron sequestering agent, sulfide modifier and other components of the compositions and method of the present invention are compatible with all types of acids and acidizing additives.

The acidizing composition of the present invention and acid compositions having the precipitation control additive of the present invention added thereto can be used in many ways. For example, the compositions can be used for small perforation cleanup treatments in wells with ferrous sulfide scaling and/or hydrogen sulfide present in the formation. The compositions can be used as a spearhead in the leading 25–33 percent of the volume of acids used for stimulating and fracturing treatments. They can be used to clean up disposal and injection wells as well as flow lines that contain ferrous sulfide and ferric oxide. The compositions are very effective for cleaning tubing and casing in sour wells even when they end up in the formation and eventually spend. They are useful for acidizing sweet wells with tubing obtained from a sour well.

The additive composition of the present invention effectively inhibits precipitation of ferrous sulfide, free sulfur and other iron and/or sulfur containing compounds from cleaning solutions that became contaminated with iron and sulfides when used to clean the surfaces of industrial equipment and the like. The additive composition can be used with both acetic and alkaline cleaning solutions.

In order to illustrate a clear understanding of the compositions and method of the present invention, the following examples are given. Although the examples are presented to illustrate certain specific embodiments of the invention, they are not to be construed as to be restrictive of the scope and spirit thereof.

EXAMPLE I

Various iron sequestering agents were tested to determine their efficacy to sequester iron in an acid solution contaminated with iron and hydrogen sulfide. The iron sequestering agents tested were citric acid, nitrilotriacetic acid (NTA) and ethylenediaminetetraacetic acid (EDTA). In some of the tests, the iron sequestering agent was combined with one or more reducing agents, oxygen scavengers and/or other sequestering agents. Hydoxylamine, a reducing agent, was tested by itself.

In each test, 200 milliliters of a 15 percent by weight hydrochloric acid solution that contained iron control additives and was contaminated with a specific concentration of a solution of ferric chloride ($FeCl_3$) was placed in a Erlenmeyer flask together with 150 grams of white marble chips. Hydrogen sulfide was injected slowly into the solution with an aeration tube. The solution was maintained at 75° F. and under atmospheric pressure. As the hydrochloric acid reacted with the marble chips, hydrogen sulfide was slowly bubbled through the aeration tube into the solution to keep the solution saturated therewith.

When the acid was completely spent, the solids were examined to identify the precipitate. The final concentration of iron present in the solution and the composition of the recovered precipitate were determined. The final concentration of iron present in the solution was determined by filtration using standard analytical procedures. The composition of the recovered precipitate was determined by X-ray diffraction. The amount of each type of precipitate was visually observed and noted.

The results of the test are shown in Table II below.

TABLE II

Sequestering Iron in the Presence of Sulfides

| Test No. | Iron Sequestering and/or Reducing Agent(s) | Amount of Agent(s) (lb/Mgal) | Initial Concentration of Ferric Iron (Fe$^{+++}$) (mg/L) | Concentration of Total Iron In Spent Acid Solution* (mg/L) | Precipitate** S | FeS |
|---|---|---|---|---|---|---|
| 1 | None | — | 1000 | 0 | L | L |
| 2 | None | — | 1500 | 0 | L | L |
| 3 | None | — | 2000 | 0 | L | L |
| 4 | Citric Acid | 50 | 1000 | 782 | S | S |
| 5 | Citric Acid | 50 | 1500 | 1105 | S | M |
| 6 | Citric Acid | 50 | 2000 | 1190 | L | M |
| 7 | NTA | 50 | 1000 | 952 | L | O |
| 8 | NTA | 50 | 1500 | 1496 | L | O |
| 9 | NTA | 50 | 2000 | 1190 | L | M |
| 10 | EDTA | 50 | 1000 | 1020 | L | O |
| 11 | EDTA | 50 | 1500 | 1360 | L | S |
| 12 | EDTA | 50 | 2000 | 1428 | L | M |
| 13 | EDTA Hydroxylamine Complex | 50 25 | 1500 | 1342 | M | S |
| 14 | EDA Erythorbic Acid | 50 25 | 1500 | 1139 | M | S |
| 15 | Citric Acid Erythorbic Acid | 50 25 | 1500 | 1500 | S | T |
| 16 | Hydroxylamine Complex | 25 | 1500 | 595 | L | L |
| 17 | Acetic Acid Citric Acid Hydroxylamine Complex | 10*** 100 25 | 3000 | 3000 | S | T |
| 18 | Acetic Acid Citric Acid Hydroxylamine Complex | 10*** 100 25 | 1500 | 1500 | S | T |
| 19 | Acetic Acid Citric Acid Hydroxylamine Complex | 20*** 100 25 | 3000 | 2875 | S | T |

*Most of the iron present in the spent acid solution was in the ferrous (Fe$^{++}$) state.
**Amount of Precipitate:
L — Large
M — Medium
S — Small
T — Trace
O — None
***Amount used in gallons per 1000 gallons of fluid.

As shown by Table II, free sulfur precipitated in each test while ferrous sulfide precipitated in most of the tests. The tests indicate that neither a reducing agent by itself nor the presence of a reducing agent with the iron sequestering agent(s) eliminates precipitation of free sulfur.

EXAMPLE II

Laboratory tests were conducted to determine the efficacy of an iron sequestering agent together with a sulfide modifier to control precipitation of ferrous sulfide and free sulfur from an acid solution contaminated with iron and hydrogen sulfide. The iron sequestering agent used in the tests was nitrilotriacetic acid (NTA). The sulfide modifier used in the tests was aldol. Reducing agents were added to the solutions in some of the tests to determine if they enhanced the results achieved.

In each test, the aldol was blended with a surface active agent comprising nonylphenol having an average of 15 moles of reacted ethylene oxide to help disperse the aldol in the acid solution. Next, 100 milliliters of an aqueous solution containing 15 percent by weight hydrochloric acid was prepared. Depending on the test, specific amounts of nitrilotriacetic acid and the aldol/surfactant blend were then added to the solution.

The solution was then contaminated with either ferric iron (Fe$^{+++}$) or ferrous iron (Fe$^{++}$) by adding a ferric chloride (FeCl$_3$) solution or ferrous chloride (FeCl$_2$) crystals, respectively, thereto. The ferric chloride solution or crystalline ferrous chloride was added in an amount sufficient to impart to the solution an iron concentration of 5,000 mg/L. In two of the tests, the ferric chloride solution or crystalline ferrous chloride was added in an amount sufficient to impart to the solution an iron concentration of 10,000 mg/L.

Next, 0.75 grams of thioacetamide (CH$_3$CSNH$_2$) were added to the solution to generate an excessive amount of hydrogen sulfide. The thioacetamide generated at least 5% more hydrogen sulfide than was required to react with the iron present in the solution.

The solution was then injected, under pressure, into a high pressure see-through cell onto an excessive amount of Iceland Spar chips (chips of pure calcium carbonate, (CaCO$_3$)), i.e., more than enough chips to allow the acid to completely spend. The solution was maintained at a temperature of 250° F. and under a pressure of 500 psi for 24 hours. The cell was pressurized with nitrogen gas.

As the acid spent, the contents of the cell were periodically observed to determine if ferrous sulfide and/or free sulfur had precipitated. After 24 hours, the spent acid was removed from the cell and allowed to stand at ambient conditions in capped bottles. The bottles were periodically observed to determine if ferrous sulfide and/or free sulfur had precipitated.

The results of the tests are shown in Table III below.

TABLE III
Controlling Precipitation From Acid Solutions Containing Iron and Sulfides

| Test No. | NTA (lb/Mgal) | Aldol/ Surf. Blend (Vol. %) | Oxidation State of Iron | Type of Precipitate Live Acid (In Cell) | Type of Precipitate Spent Acid (In Bottles) |
|---|---|---|---|---|---|
| 1 | — | — | $Fe^{+3}$ | S | S, FeS |
| 2 | — | — | $Fe^{+2}$ | $S^1$ | FeS |
| 3 | 150 | — | $Fe^{+3}$ | S | $S^2$, $FeS^2$ |
| 4 | 150 | — | $Fe^{+2}$ | — | $FeS^1$ |
| 5 | — | 2 | $Fe^{+3}$ | $S^1$ | S, $FeS^3$ |
| 6 | — | 2 | $Fe^{+2}$ | — | S, $FeS^3$ |
| 7 | 150 | 2 | $Fe^{+2}$ | — | — |
| 8 | 150 | 2 | $Fe^{+2}$ | — | — |

[1]Trace amount.
[2]Small amount.
[3]Small amount precipitated after about 2 hrs. in cell.

The results of the test show that the combination of nitrilotriacetic acid (NTA) and aldol effectively controls precipitation of ferrous sulfide and free sulfur from an acid solution contaminated with iron and hydrogen sulfide. The results show that the combination of an iron sequestering agent and a sulfide modifier is effective in controlling precipitation when acidizing sour wells.

EXAMPLE III

Various sulfide modifiers were tested to determine if they effectively inhibit precipitation of ferrous sulfide and free sulfur when combined with an iron sequestering agent in an acid solution contaminated with iron and hydrogen sulfide. The sulfide modifiers tested were aldol, propionaldehyde, butyraldehyde, and heptaldehyde.

In each test, 100 milliliters of an aqueous solution containing 15% by weight hydrochloric acid was prepared and 2 milliliters of the aldehyde being tested and 1.8 grams of nitrilotriacetic acid (NTA) were added thereto. The solution was contaminated with ferric iron ($Fe^{+++}$) by adding 2.5 milliliters of a ferric chloride ($FeCl_3$) solution containing 200,000 mg/L of ferric iron thereto. The solution was saturated with hydrogen sulfide by adding 0.75 grams of thioacetamide thereto. The final solution contained 2.0 percent by volume aldehyde, 150 lb/Mgal nitrilotriacetic acid (NTA), 5,000 mg/L ferric iron ($Fe^{+++}$) and 7.5 g/L of thioacetamide (enough thioacetamide to generate at least 5% more hydrogen sulfide than was required to react with the iron present therein).

The solution was then injected, under pressure, into a high pressure see-through cell onto an excessive amount of Iceland Spar chips, i.e., more than enough chips to allow the acid to completely spend. In the cell, the solution was maintained at a temperature of 250° F. and under a pressure of 500 psi for 24 hours. The cell was pressurized with nitrogen gas.

Immediately upon conclusion of the test, the spent acid was examined to determine if ferrous sulfide and/or free sulfur had precipitated.

The results of the tests are summarized in Table IV below.

TABLE IV
Efficacy of Various Aldehydes to Inhibit Precipitation of Ferrous Sulfide and Free Sulfur

| Sulfide Modifier | Type of Precipitate |
|---|---|
| None | S, FeS |
| Aldol | None |
| Propionaldehyde | None |
| Butyraldehyde | None |
| Heptaldehyde | None |

The results of the test show that aldol, propionaldehyde, butyraldehyde and heptaldehyde effectively inhibit precipitation of ferrous sulfide and free sulfur when combined with nitrilotriacetic acid (NTA) in an acid solution contaminated with iron and hydrogen sulfide.

EXAMPLE IV

Various iron sequestering agents were tested to determine and compare their efficacy to sequester iron and inhibit precipitation of ferrous sulfide and free sulfur when combined with a sulfide modifier in an acid solution contaminated with iron and hydrogen sulfide. The iron sequestering agents tested were nitrilotriacetic acid (NTA), ethylenediaminetetraacetic acid (EDTA) and citric acid. The sulfide modifier used in each test was a blend of aldol and the nonylphenol as previously described.

In each test, 100 milliliters of an aqueous solution containing 15 percent by weight hydrochloric acid was prepared and 2 milliliters of the aldol/surfactant blend were added thereto. The solution was contaminated with the desired concentration of ferric iron ($Fe^{+++}$) by adding an appropriate amount of a ferric chloride ($FeCl_3$) solution thereto. The solution was saturated with hydrogen sulfide by adding 0.75 grams of thioacetamide thereto. The final solution contained 2% by volume of the aldol/surfactant blend and at least 5% more hydrogen sulfide than was required to react with the iron present in the solution.

The solution was then injected, under pressure, into a high pressure see-through cell onto an excessive amount of Iceland Spar chips, i.e., more than enough chips to allow the acid to completely spend. The solution was maintained at a temperature of 250° F. and under a pressure of 500 psi for 24 hours. The cell was pressurized with nitrogen gas. One of the tests of citric acid was conducted at 200° F.

After the acid spent, the contents of the cell were examined to determine if ferrous sulfide and/or free sulfur had precipitated. The results of the test are summarized in Table V below.

TABLE V

Efficacy of Various Iron Sequestering Agents to Inhibit Precipitation of Ferrous Sulfide and Free Sulfur

| Iron Sequestering Agent | Concentration of Iron Sequestering Agent in Solution (mg/L) | Initial Concentration of Ferric Iron ($Fe^{+++}$) in Solution (mg/L) | Type of Precipitate In Spent Acid |
|---|---|---|---|
| None | — | 5000 | FeS, S |
| Nitrilotriacetic Acid (NTA) | 18,000 | 5000 | None |
| Ethylenediaminetetraacetic Acid (EDTA) | 8,160 | 1500 | None |
| Ethylenediaminetetraacetic Acid (EDTA) | 8,160 | 2000 | Trace FeS |
| N-hydroxyethylethylenediaminetriacetic acid (40% active) | 113,000 | 5000 | None |
| Citric Acid | 20,400 | 5000 | None[1] |
| Citric Acid[2] | 20,400 | 5000 | None[3] |
| Crown ether (dicyclohexyl-15-crown-5) | 36,000 | 5000 | None[4] |

[1] Although no sulfur or ferrous sulfide was detected, degradation of the citric acid was apparent.
[2] This test was conducted at 200° F.
[3] Although no sulfur or ferrous sulfide was detected, a secondary precipitate of a hydrated citrate salt did form.
[4] Crown ether decomposed to form organic residue in 24 hours at 250° F.
Note: All of the above solutions contained 2 percent by volume ethylene glycol monobutyl ether to aid in solubilizing the aldol.

The results of the test show that of the iron sequestering agents tested, nitrilotriacetic acid (NTA) is the most effective. Nitrilotriacetic acid (NTA) sequestered all of the ferric iron ($Fe^{+++}$) present in the solution. The solution of N-hydroxyethylethylenetriacetic acid was also effective.

The effectiveness of ethylenediaminetetraacetic acid (EDTA) is somewhat limited by its lower solubility in many acid solutions. Although citric acid is readily soluble and has a great efficacy to sequester iron in acid solutions, it may degrade and lose effectiveness at increased temperatures.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the compositions and methods recited herein may be effected without departure from the basic principles which underlie the invention. Changes of this type are therefore deemed to lie within the spirit and scope of the invention except as may be necessarily limited by the amended claims or reasonable equivalents thereof.

What is claimed is:

1. A method of treating a sour well penetrating a subterranean formation comprising:
   introducing into said well a treating fluid comprising an acid solution having a pH below 1.9, an iron sequestering agent comprising at least one compound selected from the group consisting of aminopolycarboxylic acids, hydroxycarboxylic acids, cyclic polyethers and derivatives of said acids and ethers, present in an amount of from about 0.25 to about 5 percent by weight of the acid solution, and a sulfide modifier comprising at least one compound selected from the group consisting of an aldehyde, acetal, hemiacetal and any other compound capable of forming aldehydes in the acid solution, present in an amount of from about 0.25 to about 5 percent of the acid solution; and
   treating said subterranean formation with said treating fluid whereby said fluid spends to a pH above about 1.9 while substantially preventing precipitation of ferrous hydroxide, ferrous sulfide and free sulfur within said formation from said spent acid solution.

2. The method of claim 1 wherein said iron sequestering agent is present in an amount of from about 1 to about 4 percent by weight of said acid solution.

3. The method of claim 1 wherein said sulfide modifier is present in an amount of from about 1 to about 4 percent by weight of said acid solution.

4. The method of claim 1 defined further to include the step of recovering at least a portion of said spent acid solution from said subterranean formation.

5. The method of claim 1 wherein said acid solution comprises at least 7.5% hydrochloric acid.

6. The method of claim 1 wherein said iron sequestering agent comprises at least one compound selected from the group of nitrilotriacetic acid and salts of said acid.

7. The method of claim 1 wherein said sulfide modifier comprises aldol.

* * * * *